(12) United States Patent
Byskal et al.

(10) Patent No.: US 10,994,198 B1
(45) Date of Patent: May 4, 2021

(54) RISK ASSESSMENT FOR PLACEMENT OF HOSTED SESSIONS

(71) Applicant: Amazon Technologies, Inc., Reno, NV (US)

(72) Inventors: Christopher Byskal, Redmond, WA (US); Natalia Rose Cavalho, Seattle, WA (US); Justin Miles, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/203,184

(22) Filed: Nov. 28, 2018

(51) Int. Cl.
*G06F 9/50* (2006.01)
*A63F 13/35* (2014.01)

(52) U.S. Cl.
CPC ............... *A63F 13/35* (2014.09); *G06F 9/50* (2013.01); *G06F 9/5027* (2013.01); *G06F 9/5038* (2013.01); *G06F 9/5077* (2013.01); *G06F 2209/5011* (2013.01)

(58) Field of Classification Search
CPC .... A63F 13/77; A63F 2300/534; A63F 13/35; A63F 13/358
See application file for complete search history.

(56) References Cited

U.S. PATENT DOCUMENTS

| | | | | |
|---|---|---|---|---|
| 7,870,044 B2 * | 1/2011 | Robertson | ............ | G06Q 20/102 705/1.1 |
| 8,533,103 B1 * | 9/2013 | Certain | .................. | G06Q 10/06 705/37 |
| 8,676,622 B1 * | 3/2014 | Ward, Jr. | ......... | G06Q 10/06313 705/7.12 |
| 9,094,291 B1 * | 7/2015 | Jackson | ................ | G06F 21/604 |
| 9,448,824 B1 * | 9/2016 | Fitzgerald | ........... | G06F 9/45533 |
| 10,026,070 B2 * | 7/2018 | Thorpe | ................ | G06Q 20/145 |
| 10,033,662 B2 * | 7/2018 | Gupte | ...................... | H04L 67/10 |
| 10,447,614 B2 * | 10/2019 | Chen | ...................... | G06F 9/5083 |
| 10,456,673 B1 * | 10/2019 | Leung | .................. | A63F 13/358 |
| 10,713,072 B1 * | 7/2020 | Burgin | ................ | H04L 67/1012 |
| 2005/0005272 A1 * | 1/2005 | Moody | .................. | G06Q 10/06 718/104 |
| 2009/0300635 A1 * | 12/2009 | Ferris | .................... | G06F 9/5072 718/104 |
| 2010/0076856 A1 * | 3/2010 | Mullins | .............. | G06Q 30/0601 705/26.1 |
| 2010/0319004 A1 * | 12/2010 | Hudson | ................ | G06F 9/5072 719/313 |

(Continued)

*Primary Examiner* — Steven J Hylinski
(74) *Attorney, Agent, or Firm* — Hogan Lovells US LLP

(57) ABSTRACT

New application sessions can be placed on reclaimable resource capacity that can be provided at lower cost than dedicated capacity, but with risk that the capacity might be reclaimed before completion of the session. A number of instance types can be determined that are capable of hosting a new session. Risk scores can be calculated for the instance types, as well as the cost of instances of each type. An instance type can be selected for the session using the risk scores and cost information, where the instance type will have relatively low risk with a relatively low cost for the instance. Once an instance type is selected, a resource pool can be selected from which to provide the resource instance of the selected type. The instance can then be allocated and caused to host the session or perform related functionality.

20 Claims, 9 Drawing Sheets

(56) References Cited

U.S. PATENT DOCUMENTS

| | | | |
|---|---|---|---|
| 2011/0238460 A1* | 9/2011 | Al-Dawsari | H04M 15/43 705/7.31 |
| 2011/0320606 A1* | 12/2011 | Madduri | G06F 9/5005 709/226 |
| 2012/0131174 A1* | 5/2012 | Ferris | G06F 9/5072 709/224 |
| 2012/0131591 A1* | 5/2012 | Moorthi | G06Q 10/06 718/104 |
| 2012/0311577 A1* | 12/2012 | Lee | G06F 9/5077 718/1 |
| 2012/0324092 A1* | 12/2012 | Brown | G06F 9/5044 709/224 |
| 2013/0007272 A1* | 1/2013 | Breitgand | G06F 9/5077 709/224 |
| 2013/0060933 A1* | 3/2013 | Tung | G06F 11/3495 709/224 |
| 2013/0274020 A1* | 10/2013 | Novotny | A63F 13/12 463/42 |
| 2014/0101226 A1* | 4/2014 | Khandekar | H04L 67/1008 709/203 |
| 2014/0229221 A1* | 8/2014 | Shih | G06Q 10/06312 705/7.23 |
| 2014/0244311 A1* | 8/2014 | Dawson | G06Q 40/08 705/4 |
| 2015/0067171 A1* | 3/2015 | Yum | G06F 9/5072 709/226 |
| 2015/0142978 A1* | 5/2015 | Anderson | H04L 41/5019 709/226 |
| 2015/0363851 A1* | 12/2015 | Stella | G06Q 30/0631 705/26.41 |
| 2016/0034835 A1* | 2/2016 | Levi | H04L 67/10 705/7.23 |
| 2016/0205037 A1* | 7/2016 | Gupte | H04L 67/10 709/226 |
| 2016/0321115 A1* | 11/2016 | Thorpe | H04L 47/823 |
| 2016/0321152 A1* | 11/2016 | Andre | G06F 11/008 |
| 2018/0375787 A1* | 12/2018 | Chen | G06F 9/4843 |
| 2019/0130327 A1* | 5/2019 | Carpenter | G06Q 10/0635 |
| 2019/0166007 A1* | 5/2019 | Sundaram | H04L 43/0817 |

* cited by examiner

RISK ASSESSMENT FOR PLACEMENT OF HOSTED SESSIONS

BACKGROUND

The widespread adoption of a variety of computing devices has resulted in a corresponding increase in the variety of applications available to users. For gaming applications, many of these games enable users to engage in online multiplayer games, which may be hosted by a central gaming server. The amount of resource capacity needed to host the variety of games has become significant, such that many providers use third party resource providers to host the games. While such an approach prevents the game developers from having to purchase and manage a large fleet of resources, the need to purchase capacity from these providers can still be significant. For large games that require significant capacity, this can still be too expensive for the developers to utilize for an extended period of time, or without charging excess fees to the players of those games.

BRIEF DESCRIPTION OF THE DRAWINGS

Various embodiments in accordance with the present disclosure will be described with reference to the drawings, in which.

DETAILED DESCRIPTION

Figure 1:
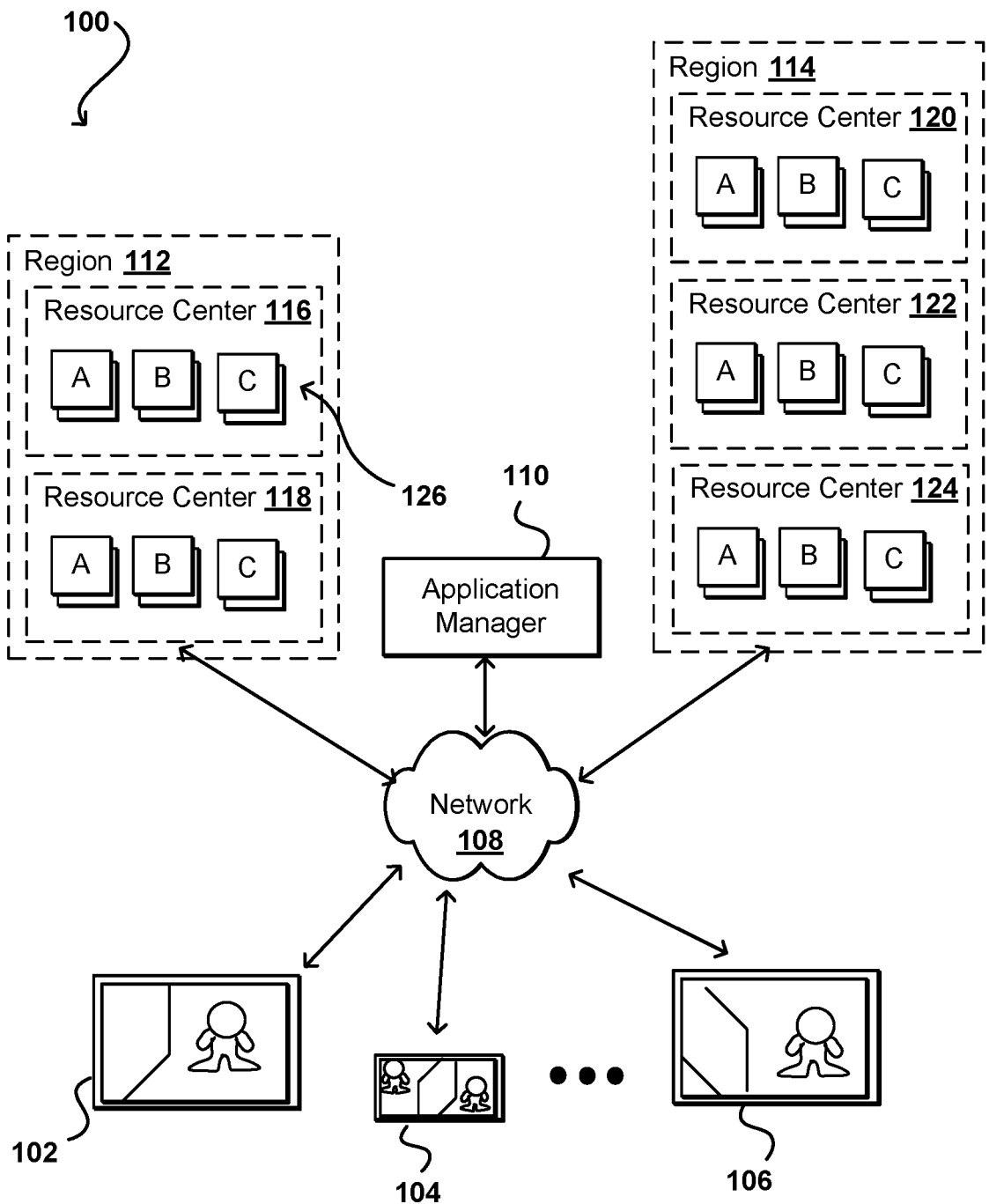
FIG. 1 illustrates an example environment in which aspects of the various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for execution and management of hosted applications. In particular, various approaches provide for the dynamic selection and allocation of resource capacity to be used to host specific application sessions, including individual processes (i.e., application servers) for those sessions. When requesting an application session to be hosted in a shared resource environment, such as through submission of a session hosting request, for example, the session may have various criteria that enable it to be hosted on different types of resources, such as different types of resource instances (i.e., virtual machines) operating on physical servers. The criteria in some embodiments may be at least partially specified by the session hosting request, although in other embodiments the request may specify a type of session which may be associated with various hosting criteria, among other such options. Once appropriate resource capacity is identified, that capacity (such as a computing instance as discussed herein) can be allocated and caused to execute one or more processes for the game session, such as to function as a game server.

Since dedicated capacity can be relatively expensive for at least some types of applications, approaches herein enable sessions to be allocated using resource capacity that has been allocated to a specific customer, but is not currently being utilized for processing or other functionality on behalf of that customer. This capacity can be made available for other processing tasks, or for other allocations, during periods where the primary customer is not using that capacity. The primary customer can have the ability, however, to reclaim this capacity. This reclaimable capacity is often referred to as spot capacity, as the spot capacity will be available only when not in use on behalf of the primary customer, or another such entity, and only until such time as it is reclaimed. A minimum amount of notice may be provided, such as at least one or two minutes, before the capacity is reclaimed. This capacity can come at a much lower price point than dedicated or reserved capacity, but runs the risk of being reclaimed at any time.

A placement manager or service in accordance with various embodiments can determine various types of resource capacity that are able to host a game session, or able to otherwise execute a specific application or task. These can correspond to types of resource instances, for example, that are available to be allocated and that satisfy one or more hosting criteria for the session. The instances types may be provided from multiple resource pools located in multiple physical locations. In some embodiments the amount of available capacity of each instance type can be determined, and instance types with less than a minimum number of available instances or less than a minimum ratio of available to allocated instances truly be excluded from consideration. For the remaining instance types, a risk score can be calculated which is an indication of a likelihood that a resource instance (or other resource allocation) of the instance type will be reclaimed during the session or task to be executed. Cost information for these instance types can also be obtained. A selection algorithm can then be used to select an instance type to host the session using the risk scores and cost information, such as to select the type with the lowest risk or lowest cost, or a weighted combination of risk and cost, among other such factors. In at least some embodiments, the selection algorithm can consider other aspects as well, such as may be based upon preferences for the resource environment. For example, the resource environment might prefer that one instance type be allocated over another instance type for a number of different reasons, such as may relate to cost, availability, testing, performance, and the like. For example, if two instance types both meet game developer preferences then the type might be selected that is most beneficial to the resource provider or other otherwise satisfies resource provider-specified criteria or prioritization. Once an instance type is selected, a resource pool can be selected from which to provide the resource instance of the selected resource type. The resource pool can be selected based on various factors, as may include the relative locations of player devices to participate in the session, in order to reduce session latency. The instance can then be allocated and caused to function as a game server for the game session, for example, or perform other tasks as discussed herein. Such an approach enables a new session to be placed with low risk of interruption and at relatively low cost with respect to dedicated capacity. The system is able to fallback to alternative instance types as needed. In addition to the advantages obtained by application developers and users, such an approach provides various technical advantages as well. For example, resource capacity can be utilized much more effectively, reducing cost for operating the resources and the amount of management needed for the resources. If certain capacity can be reallocated, the total amount of capacity needed can be reduced, as the total amount of capacity needed is less when allowing for spot usage than when requiring all users to obtain dedicated capacity. This also comes with advantages of lower power consumption and reduced infrastructure requirements.

Various other functions can be implemented within the various embodiments as well as discussed and suggested elsewhere herein.

FIG. 1 illustrates an example electronic environment 100 in which aspects of the various embodiments can be implemented. In this example, there are a number of player devices 102, 104, 106 requesting to participate in a multiplayer gaming session managed by an application manager 110. Similar configurations can be utilized to support other types of applications for other types of client devices as well as would be apparent to one of ordinary skill in the art in light of the teachings and suggestions contained herein. In this example, the multiple player devices 102, 104, 106 are participating in a multiplayer gaming session hosted by at least one processing instance 126, or other processing resource, offered through a resource provider environment. The processing instance can be any appropriate type of processing resource, such as a physical or virtual server or machine instance as discussed elsewhere herein. A processing instance can store and execute code for one or more processes for a gaming session, or may execute all server-side code for the game or game session, etc. The player devices 102, 104, 106 will transmit player state data over at least one network 108 that is received to the allocated processing instance (or the instance responsible for maintaining game state) and the aggregated game state data can be stored or cached locally on the processing instance, or at least otherwise made available. The resource provider environment may be associated with an entity other than a developer or provider of the gaming application. If separate entities, a game developer might purchase an amount of resource capacity from the resource provider that can be provided using available capacity of a set of resources, which may be maintained in a pool of resource capacity. As known for such purposes, a given physical machine may have unused portions of its capacity allocated to such a capacity pool. Each resource may be able to host multiple game sessions, and the allocation of those resources can be managed by a resource manager or other such component, process, or service as discussed in more detail elsewhere herein.

In this example the game offers multiplayer capability, whereby multiple players can utilize their respective devices to connect to the allocated processing instance 126, which may function as a game server, over at least one network 108, such as the Internet, a local area network, a dedicated gaming network, a peer-to-peer network, or a cellular network, among other such options and combinations thereof. The players can join in a session of the game with state data that is managed by a game state component of the game server. In some embodiments, players can join an existing session in process, and leave during the session, such that the number of players may vary over time. The player devices can include specific gaming devices, such as gaming consoles or handheld consoles, or other computing devices such as smart phones, tablet computers, wearable computers (e.g., smart glasses or watches), desktop or notebook computers, and the like. State information can be transmitted from the player devices at appropriate times, such as periodically, in response to certain actions or occurrences in the game, in response to requests from the server, or at other appropriate times. The processing instance can maintain the game state information such that the game state is consistent across the various devices, as well as to enable a saving or restoring of the game for any or all of the devices.

In many instances, a first player will submit a request to join a session of a specified gaming application supported by the processing instance. If there is an existing game session for which the player qualifies, such as by having an appropriate skill level or qualification, then the player can be added to the existing game session. If there is no existing game session for which the player qualifies, or if games can only be joined before the session starts, then the request can trigger the initiation of a new session for the game. If a resource is not already allocated for this session, then a new resource or resource instance can be allocated in response to a request from the application manager 110. In some embodiments the new session can begin immediately, while in other embodiments or for specific games there might need to be a specified number, minimum number, or quorum of players for a session before the session can begin. For example, if a game requires ten players then a session might not start before ten players have joined, with the first nine players having to wait at least until a tenth player joins. In some cases additional players can join during a session, such as up to a maximum number of players in some embodiments, while in others players may not be able to join, or may only be able to join if a current player leaves the session, etc.

In many situations, the player devices will be at different geographical locations. In order to ensure that all the game state information utilized by the player devices is accurate, player input in many cases will be transmitted from the individual player devices to the relevant processing instance, such that the game state can be updated and propagated to the various player devices, whereby the devices are all utilizing consistent game state information. The game state information can include, for example, position and orientation information for the players and objects in the game, as well as gameplay data for actions being performed in the game environment by any of the players or other gameplay elements. Such an approach can result in difficulty managing state for the game, however, as any instance of player data must be transmitted from the respective player device to the server, and sent back to the relevant gaming devices. Since players can have various types of network connections with differing speeds, including cellular and landline-based connections, there can be significant latency involved in getting gameplay data from one player device to another. For games such as real time, multiplayer online video games, this latency can have a meaningful, negative impact on gameplay. For example, if the game involves throwing a ball or shooting a paint gun, a first player might direct the action towards a last known location received for a target player. The action will be likely to miss, as the other player may have moved since the last received location such that the first player may see the action take place but the action will actually fail because when the game state data is synchronized the target player will actually not have been in that location. The game server then might have to retract the apparently completed action, or wait to determine whether the action is successful, either of which can significantly degrade the gaming experience.

It might be the case that the available resource capacity is located in different geographical or physical locations. The distance between the resource and the gaming devices can further impact the latency for the game session, which can have negative implications as discussed. Thus, it can be desirable in at least some situations to attempt to provide the capacity using resources that are relatively close to the players to the game, in order to minimize latency due to physical distance. It may not always be practical, however, to select the closest available resource capacity, however, as there may be other considerations relating to the selected resource. For example, different types of resource capacity can have different costs, and it may be cheaper for a developer to buy a fixed amount of capacity even though that capacity might not always be the closest to the potential players.

In order to help alleviate this problem, some resource providers enable customers, such as game developers, to purchase resource capacity, such as specific compute instance, on an as-needed basis, or on-demand. The ability to purchase capacity with this amount of flexibility comes with a certain price, however, as the resource provider has to maintain sufficient available capacity to support this offering. Accordingly, a resource provider environment can provide different capacity offerings that are able to support the performance of various tasks, such as hosting game sessions, at a lower price and/or with greater flexibility.

A particular aspect to certain types of games, versus other electronic applications, is that many types of games have fixed or maximum durations or times of execution. For example, a sporting game might have a fixed time limit, and other games might have a maximum amount of time allocated to complete a task, such as a time limit for completing a race. Given some amount of time for startup and completion, for many types of games a determination can be made as to the maximum length of time for which a resource will be needed. For such an approach, a customer might be able to purchase a limited-time resource, such as a compute instance that will be exclusively allocated to that customer for up to the maximum amount of time. In some embodiments the customer may only be charged for the amount of time actually used, but will have that resource reserved for up to the allocated amount of time.

For other games, the length of time may not be reasonably certain or determinable. For these types of games, a limited time resource may not be appropriate. It might be the case, however, that due to the nature of the game or the revenue model for the game that the developer may want to use lower cost resources where available. For some of these developers it may make sense to purchase excess resource capacity where available. Such an approach is sometimes referred to as a "spot" market, whereby customer can purchase or bid for capacity that is reserved for other customers but not currently being used for serving requests or performing other such functions. Since this capacity is already paid for by another customer or entity, the excess capacity can come at a significantly lower price than if reserving that amount of capacity. The customer having reserved the capacity may also get some discount or price break for allowing the excess capacity to be made available on the spot market. A customer can attempt to obtain the lower cost capacity, and use it as long as it is available and the gaming session is active. It is always possible, however, that the reserved customer can reclaim that capacity for use. The reclaiming of that capacity can cause the gaming session hosted on that capacity to end, although in other embodiments the session may be able to be moved to other, potentially higher cost resources. In many embodiments a notice will be provided at a point in time before the termination of the resource allocation, such as two minutes before the capacity will be reclaimed for use by the reserved customer. The game developer can then take various actions to account for the early termination, such as to notify the players and potentially modify one or more aspects of the game, as discussed in detail elsewhere herein. The spot instances may be the least expensive option, but are not guaranteed for any length of time other than the notice period in some embodiments. In at least some embodiments, however, there may be at least a minimum amount of time for a spot instance, such as at least five minutes in some embodiments.

As illustrated in FIG. 1, there may be multiple types of instances that can be provided from multiple locations and types of hardware. In this example, there are a plurality of physical resources, such as racks of servers and network infrastructure, offered through a resource provider environment. That environment might constitute a single location or multiple locations. In the illustrated example, the resources are provided in at least two regions 112, 114, which can be different geographic locations, such as different regions in the same country or regions in different countries, among other such options. Within each region 112, 114 there may be multiple locations from which the resources can be allocated. These can include, for example, resource centers 116, 118, 120, 122, 124 such as server farms, data centers, and the like. For a given resource center, there may be physical resources of one or more types that are able to offer resources, such as physical or virtual resource instances 126 as discussed herein, to support or execute specified functionality. This can include, for example, allocating a resource instance to function as a game server for a multiplayer game as discussed herein. A request to host a game session may be received to the application manager 110, which can work with one or more systems associated with the resource provider environment to select a type of instance to be allocated for the session, and cause an instance of that type to be allocated for the session. The instance can be of an appropriate type (e.g., A, B, or C in the figure), from a selected resource center, in a selected region. As mentioned herein, instance types can differ based on a number of factors, such as processing capacity, memory capacity, type of physical hardware, bandwidth, latency, operating system, installed software, and the like.

Figure 2:
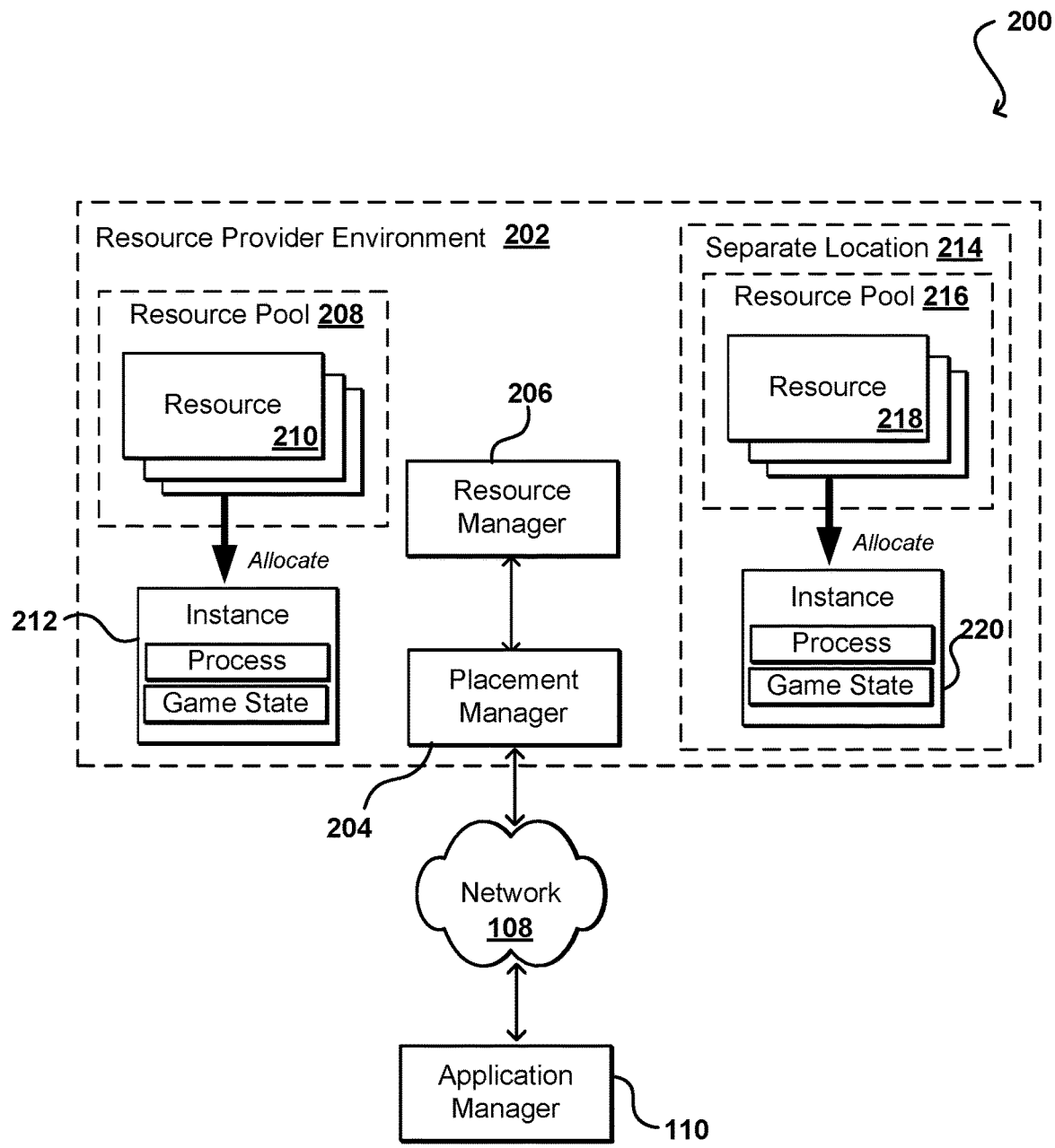
FIG. 2 illustrates a system for allocating instances for application sessions that can be utilized in accordance with various embodiments.

FIG. 2 illustrates a view of a portion of a resource provider environment system 200 that can be utilized in accordance with various embodiments. In this example, an application manager 110 sends a request for a game server instance across a network 108 to a placement manager 204 of the resource provider environment. There can be a single placement manager for the entire environment, or a placement manager for each region, resource center, or other resource grouping or offering in accordance with various embodiments. The placement manager 204 in this example can work with a resource manager 206, where the resource manager maintains the available instances offered by resources in the environment. This can include, for example, provisioning instances, managing resource capacity, configuring resources, and other such tasks as discussed later herein. The placement manager in this example can contact the resource manager 206 to obtain information about the available capacity, such as the number and types of resource instances available.

In this example, the resource manager manages one or more resource pools 208, 216 that can be in the same location or at least one separate location 214. Each pool can include a set of resources 210, physical and/or virtual, that have available capacity and are able to be allocated to perform certain tasks. Each pool can include resources of a single type or multiple types, having similar or different sizes and configuration, etc. Once receiving the information, the placement manager can determine a type of instance to be allocated for the session. The placement manager may also select a location from which that type of instance is to be allocated. For example, based on factors such as location or expected latency the placement manager could choose to allocate an instance 212 of a specified type from a first resource pool 208 in a first location or an instance 220 from a second resource pool 216 in a second location 214, which can be a different resource center, region, geographic location, etc. Once allocated, the instance can load the appropriate game software (if not already loaded) to execute for the game session. The instance can also maintain game state for the session, storing the authoritative copy of the game state that can be propagated to the individual player devices.

When attempting to obtain capacity to host a game session, a customer of a resource provider can provide various criteria for the type of resource instance to be allocated. This can include criteria relating to processing speed, minimum amount of available memory, operating system, and the like. A customer may also specify, or agree to, certain performance criteria, such as maximum latency or minimum throughput, among other such options. The customer may also specify criteria such as maximum pricing per instance or per period. A customer may also be able to specify whether to favor cost savings or game performance, among other such options. A placement manager can then use these and other factors to determine which instances to allocate for the customer for session hosting or other such requests. In at least some embodiments, resource instances can be allocated that are reserved or dedicated for that customer over a specified period of time.

For applications such as online multiplayer gaming, customers such as game developers will often want to obtain the game servers, or server instances, at the lowest possible cost, while maintaining minimum performance levels. As multiplayer games can have large numbers of concurrent players, and each connection to a game server for a player corresponds to a resource that has to be provisioned and maintained, the cost for providing servers can be significant. For games such as mobile games where the price to purchase a game may be minimal, if any upfront cost is even charged, there may be little margin available. While dedicated capacity would be preferred, the cost can be relatively high such that only up to a certain amount of capacity may be able to be purchased, which may result in some potential players being unable to have an instance allocated to access a session of the game.

Accordingly, approaches in accordance with various embodiments enable sessions to be allocated for applications as needed, but where the capacity allocated is not guaranteed to be available for an extended period of time. Such instances may be provided out of excess capacity, such as capacity allocated to specific customers of a resource provider environment who are not currently utilizing that capacity. Another customer may be able to purchase at least some of that capacity at a significantly reduced price, with the understanding that the customer to whom the capacity is dedicated may reclaim that capacity at any time with minimal warning, such as with notice of one to two minutes. While the capacity can be obtained relatively cheaply, such as on the order of 10%-20% of the normal cost in some cases, the risk of a session being interrupted may be unacceptable for at least certain types of applications. For example, players may have a poor or unsatisfactory experience if a game is interrupted in the middle of a session.

Approaches in accordance with various embodiments attempt to minimize this risk through intelligent placement of game sessions, or selection of resource instances, based at least in part upon a determined or anticipated risk for different types or sources of instances. For example, a placement manager may determine a set of available instance types that can provide capacity for a game session. The placement manager can determine an amount of risk, such as may be indicated by a calculated risk score in some embodiments, that is associated with each type of instance. Based at least in part upon the determined risk scores, the placement manager can select an instance type with the lowest risk score, or that at least has a risk score lower than a maximum risk threshold, among other such options.

As discussed in more detail later herein, embodiments can take advantage of "spot" capacity, as referred to herein, that is available for a reduced price (or other reduced compensation) with respect to conventional on-demand capacity, with the lower price due to the fact that the capacity cannot be guaranteed for longer than a notification period, for example, and may be reclaimed at any time. Other types of capacity and resources can be selected, allocated, or otherwise used as well within the scope of the various embodiments. For any capacity that is not guaranteed for a specified period of time, or that otherwise is at risk of being reclaimed, reallocated, or otherwise made no longer available with little or no notice, a determination can be made as to the level or amount of risk of that type of capacity, such as a type of resource or resource instance. A risk score, for example, can be calculated using various factors discussed herein, as may relate to current, historical, or anticipated network, system, application, or resource conditions. The risk scores for various types of capacity can be calculated or otherwise determined, then used to determine a type of capacity to allocate or select for a specific application or session, etc. The amount of risk that is acceptable may vary by application or customer, for example, as the processing of a large number of data records over time may not be significantly impacted by an occasional interruption, but players of a multiplayer online game session may have a poor experience if the session is terminated in the middle of the session and with little warning or notification.

Accordingly, a system or component such as a placement manager 204 can analyze various current, historical, and/or predicted data to attempt to determine risk scores, or other such values, to be used in making instance selection, or application placement, decisions. In other embodiments, a separate or dedicated system or service (not shown) may provide risk data to such a placement manager, among other such options. Such a service may be operated by a third party provider in at least some embodiments.

In various embodiments, a risk assessment process can assess the risk of selecting one type of resource instance (physical or virtual) over another, based at least in part upon real-time conditions of the various resource pools 208, 216 available. The risk assessment can also analyze data feeds from other customers, applications, or entities to which resource instances have been allocated, regarding interruptions that have occurred for prior placement decisions. Risk scores can be determined for various types of available instances, whereby a placement manager 204 or other such system or service can select a type of instance with an acceptably low risk of interruption with a relatively low cost, at least with respect to other instance types available for the placement. As discussed elsewhere herein, the placement may select the instance type with the lowest risk, or having the lowest cost, or a weighted combination of the two, among other such options, for any placement request received for a new session or execution, etc. Such an approach can provide application developers and other such entities to obtain the benefit of low-cost instances while largely mitigating the downside risk associated with the use of spot instances. The placement manager 204 can also fallback to alternative instance types that are not as risky as needed, although these instance types may be more expensive. Such an approach provides a strong player experience with low likelihood of interruption, with a relatively low cost approach that utilizes lower cost spot instances, or other such capacity, then the risk tolerance for a given application allows for such placement for current network conditions. The improved risk tolerance provides significant advantages over conventional spot capacity markets, where a customer would not have any assessment of risk before placement is made.

In one embodiment, a risk scoring assessment is made for each placement request made for an application, such as for each game session request for a specified gaming application. The data analyzed can include, for example, the amount of capacity in specific resource pools, such as may be available for a particular region. The amount of capacity can include an overall amount of capacity of a certain type, or number of available instances of a certain type, among other such metrics. Such data can be useful as a relatively small number of available instances in a given pool might make it more likely that some of that capacity may be reclaimed, since much of the capacity is currently allocated. Thus, the number of available instances might impact a weighting applied to that type of instance in a risk assessment or scoring process. In some embodiments, having less than a threshold number or ratio of available instances of a specific type might cause that instance type to be excluded from consideration for a given placement entirely.

Another data point can involve an amount of time since a last interruption of a specific type of instance, whether for a specific pool or set of pools, or across the resource environment. A more recent interruption might be indicative of a higher likelihood of another interruption for that instance type. A similar factor in another embodiment might be the number or frequency of interruptions over a recent or preceding period of time, such as the last hour. This could look at the number of interruptions of a certain type of instance over a sliding window of time, such as a window of an hour in duration, where up to a certain number might be acceptable, such as up to a specified interruption threshold. In another embodiment the number of interruptions over the window may be factored into the score, where a higher number of interruptions will result in a higher risk score for that type of instance.

Another factor that can be taken into consideration is the current "spot" price for a particular instance type. The price of spot capacity can fluctuate over time, and will generally track the demand or amount of capacity available. As the amount of available capacity of a certain type increases, the price for that capacity will often decrease, and vice versa. Thus, the cost can be utilized as a risk factor as a low cost may be correlated with a significant amount of available capacity, and lower likelihood of interruption. A high cost may similarly be associated with a relatively small amount of available capacity, and higher likelihood of interruption. In some embodiments, trends in the spot price can also be used to determine risk for a type of instance over an upcoming period of time. If the price is dropping, it can mean that more capacity is becoming available and the likelihood of an interruption is decreasing. If the price is rising, a greater amount of capacity is being used which may make it more likely for an interruption to occur for capacity being reclaimed. Some embodiments can also look at the rate of change in the price, as large increases in cost may be indicative of a high likelihood of interruption for capacity reclamation. A risk assessment function may then take into account not only the current price, but the amount and/or rate of change in the price over a recent period of time. In some embodiments, historical information may also be used to predict changes in price for a certain period, such as a holiday period or weekend, which may be used to calculate expected risk for an upcoming period.

Thus, a risk assessment algorithm may take an average, or weighted average, look at each relevant factor, where those factors are normalized, such as having a value from 0 to 1. So an assessment algorithm might look at three factors, such as time since last reclamation, capacity ratio, and pending requests, and determine a weighted average of those to use to calculate the risk score, where the weights may be assigned by the customer or provider, or learned or updated over time using, for example, machine learning or data analytics. Various other functions can be used as well as would be apparent to one of ordinary skill in the art in light of the teachings and suggestions contained herein.

In one embodiment, a placement manager can first determine the criteria for an instance needed to serve a particular request. For example, a game developer or publisher might specify various criteria that a resource instance must satisfy in order to function as a game server for a session of a specific gaming application. This might include criteria such as minimum processing capacity, minimum memory capacity, maximum latency, minimum throughput, minimum connection capacity, etc. Various other factors such as type of operating system and supporting software or protocols can be specified as well within the scope of the various embodiments. In some embodiments, a placement manager 204 can first attempt to identify the resource pools 208, 216 that include capacity, or instance types, that satisfy these criteria. From these criteria, the placement manager can then attempt to select an instance type for the request using the risk scores and cost information, among other such factors discussed and suggested herein. For example, if there are two types of instances that are determined to be equivalent from a cost and risk standpoint, the placement manager may select the instance type that offers the lowest latency.

In one embodiment, each request for a new game session to be hosted is placed in a queue (not shown), such as a placement queue or session queue for temporarily storing session hosting requests. The placement manager can then take the requests or jobs in order from the job queue and attempt to determine placement for those requests in order. For game sessions, the game may be of a type that has limited time sessions, such as those that may have durations on the order of twenty to thirty minutes or less. At the end of each session the players may request another session, such that a new entry is placed in the queue. It might be the case, then, that the sessions for a similar group of players or for the same game are placed on different instance types based on changes in the resource environment. In at least some embodiments the risk is reevaluated each time a job is pulled from the queue, such that the optimal selection can be made for each placement decision. In some embodiments, each session will be placed on the instance type with the lowest risk at the time of the placement, among other selection approaches presented herein. In one embodiment there might be dozens of instance types in a given region, with at least some of those being offered from different resource pools. The risk for the various instance types can be determined overall, as well as for specific resource pools or other locations, and the selection of a type can be made along with a location or pool from which to obtain that instance.

There may be additional considerations for resource selection as mentioned herein. For example, the customer might provide a maximum acceptable latency threshold that must be satisfied. It might be the case, then, that available excess capacity could be used to host the game session, but that the latency cannot be guaranteed to be within the allowable limit based upon factors such as physical distance between the capacity and the players. Thus, different but more expensive capacity may need to be selected. In some embodiments there may be excess capacity available that is cheaper but comes with greater latency. There may also be limited-time capacity that is slightly more expensive, but offers better latency performance. A selection algorithm or weighted combination of factors can be used in some embodiments to select the appropriate capacity for hosting a session. As mentioned, a customer might select to optimize for performance or cost, which can impact the selection process. The customer might also provide some criteria, such as a function that indicates the acceptable tradeoff between cost and latency. Such a function may also take into account the risk of interruption. A resource allocation manager or other such component may then generate a score for each resource option, which can then provide a ranking or other indication for the various options. In such an embodiment, the highest ranking option may be selected, where the score is based on a combination of factors that may include projected or historical latency, projected risk of interruption, and cost, for resource capacity that is able to be provided of the type and for the length of time requested. In some embodiments the cost savings might not be in a per-minute savings but in a per session savings. For example, if a prior approach sold capacity by the hour then an approach that enables a customer to buy capacity by the minute might charge more per minute, but a three minute allocation may cost significantly less than a one hour allocation. On the other hand, capacity that is not guaranteed and can be interrupted may be significantly less on a per-minute (or other measure) basis. In some embodiments the session requests can include bid prices for each type of capacity, where the request specifies a ranking and price for each available capacity option and then the highest ranked option where the bid is a winning bid is selected for that customer session. Approaches to bidding for resource capacity are known in the art and, as such, will not be discussed herein in detail. Such an approach would expand upon the options available for bidding through such a system.

In some embodiments a customer may also be able to specify a set of instance types that can be used to support a specific type of game session. The customer can provide the relevant configuration for each, as well as the maximum latency or interruption risk values, etc. This information can be used to determine the available capacity for a session, and the individual characteristics and criteria can then be used to rank the options within that available capacity. As mentioned, the customer can also provide information as to whether to optimize for performance or cost as discussed herein. This information can be analyzed for each received request, such as for each gaming session to be hosted in a resource provider or "cloud" environment. Once any relevant selection criteria are determined, a resource manager 206 can allocate one or more resources to host the gaming application, or one or more processes for the gaming session. The gaming devices can then connect to the allocated processing instance for purposes of participating in the gaming session.

Figure 3:
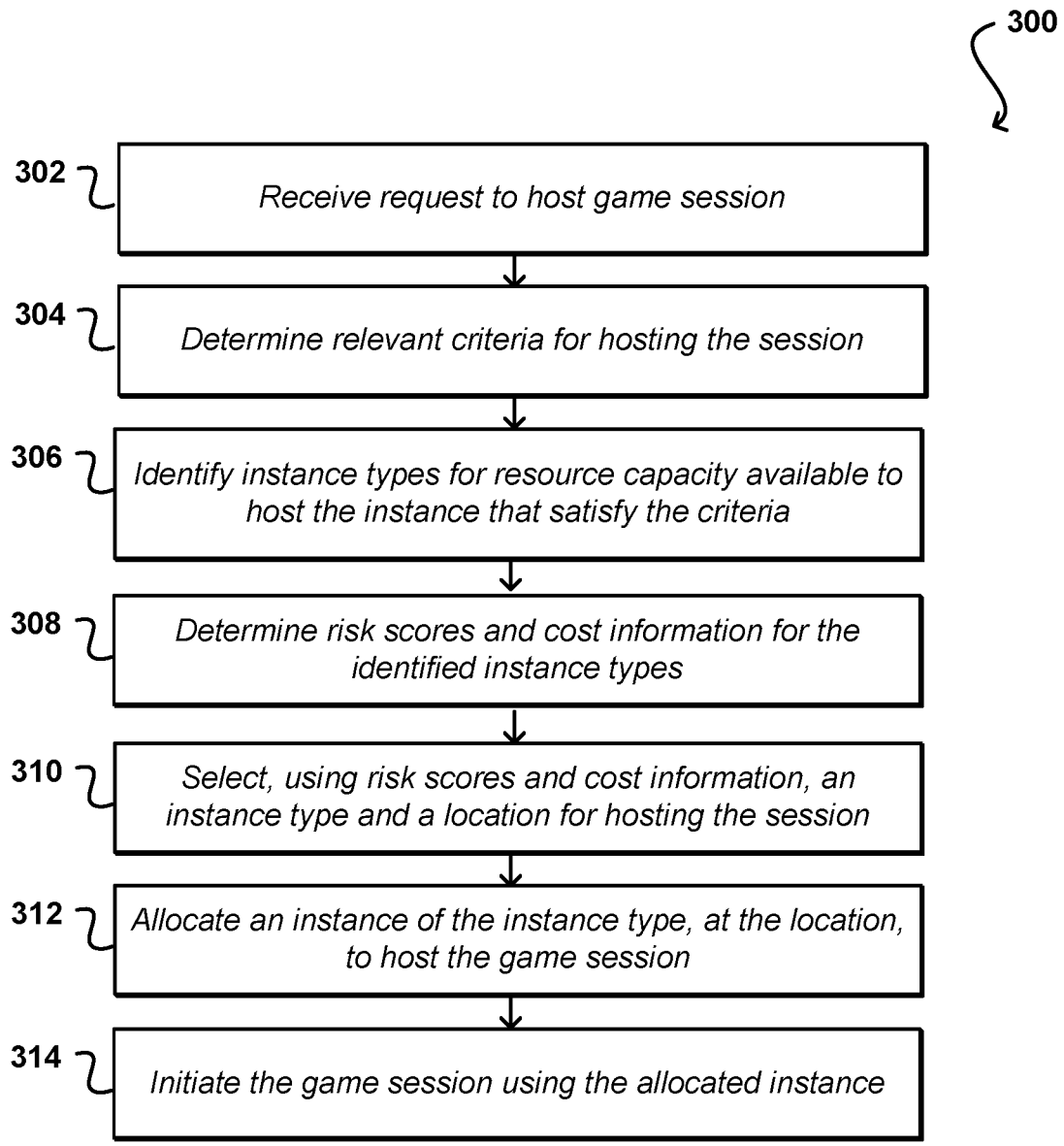
FIG. 3 illustrates an example process for selecting instance types for resource allocation that can be utilized in accordance with various embodiments.

FIG. 3 illustrates an example process 300 for identifying resource capacity to host a game session that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of applications or content can benefit from advantages of the various embodiments as well. In this example, a request is received 302 to host a game session using resource capacity from a resource provider environment. The request can be received from a game publisher system or from an individual client device to participate in the game session, among other such options. In at least some embodiments, one or more aspects of the request are verified before processing. These aspects can include, for example, a valid request format, a type of game capable of being hosted by the resources, authorization to host the game, a valid requestor identity or gaming customer identity, and the like.

If the request is a valid and authorized request in this example, the relevant hosting criteria for the game session can be determined 304. As mentioned, this might include a set of types of resources that the customer has approved for hosting sessions, a length of time needed for the game session, as well as various criteria as discussed elsewhere herein. The hosting criteria can also include criteria relating to maximum latency, minimum throughput, minimum bandwidth, minimum processing capacity, minimum memory capacity, specific operating system or support software, and the like. A resource management service or other such system can identify 306 the type(s) of resource capacity that are available to host the instance that satisfy the above criteria. These types can include, for example, types of physical resources with specific types or amounts of capacity, or types of resource instances operated by those physical resources. The types can include different pricing or purchase options as well, as may relate to on-demand capacity purchased for an extended period of time, limited time capacity, or excess but interruptible capacity (i.e., "spot" capacity), among others. The various hosting options can be analyzed to determine 308 risk scores and cost information for the identified instance types. In various embodiments, a risk assessment algorithm can accept current, historical, or predicted data for use in assessing the risk for a given instance type, and cost information can be obtained from a pricing manager or other such system or service, where the cost can vary and be determined dynamically based on network conditions, including but not limited to an amount of available capacity of a specific instance type at a specific point in time. The risk scores and cost information can be used to compare the various options, in order to select 310 an instance type and location for hosting the session. As mentioned, this can include selecting the option with the lowest risk, or the option with the lowest cost that has below a maximum threshold amount of risk, among other such options. Once an instance type and location have been selected, an instance of the selected instance type can be allocated 312 for the game session from a resource pool, or other source of capacity, from the determined location. The game session can then be initiated 314 using the allocated instance. This can include, for example, loading the game content onto the instance as necessary, and enabling the individual player devices (or intermediate devices) to connect to the resource instance, which will function as the game server for the requested session.

Figure 4:
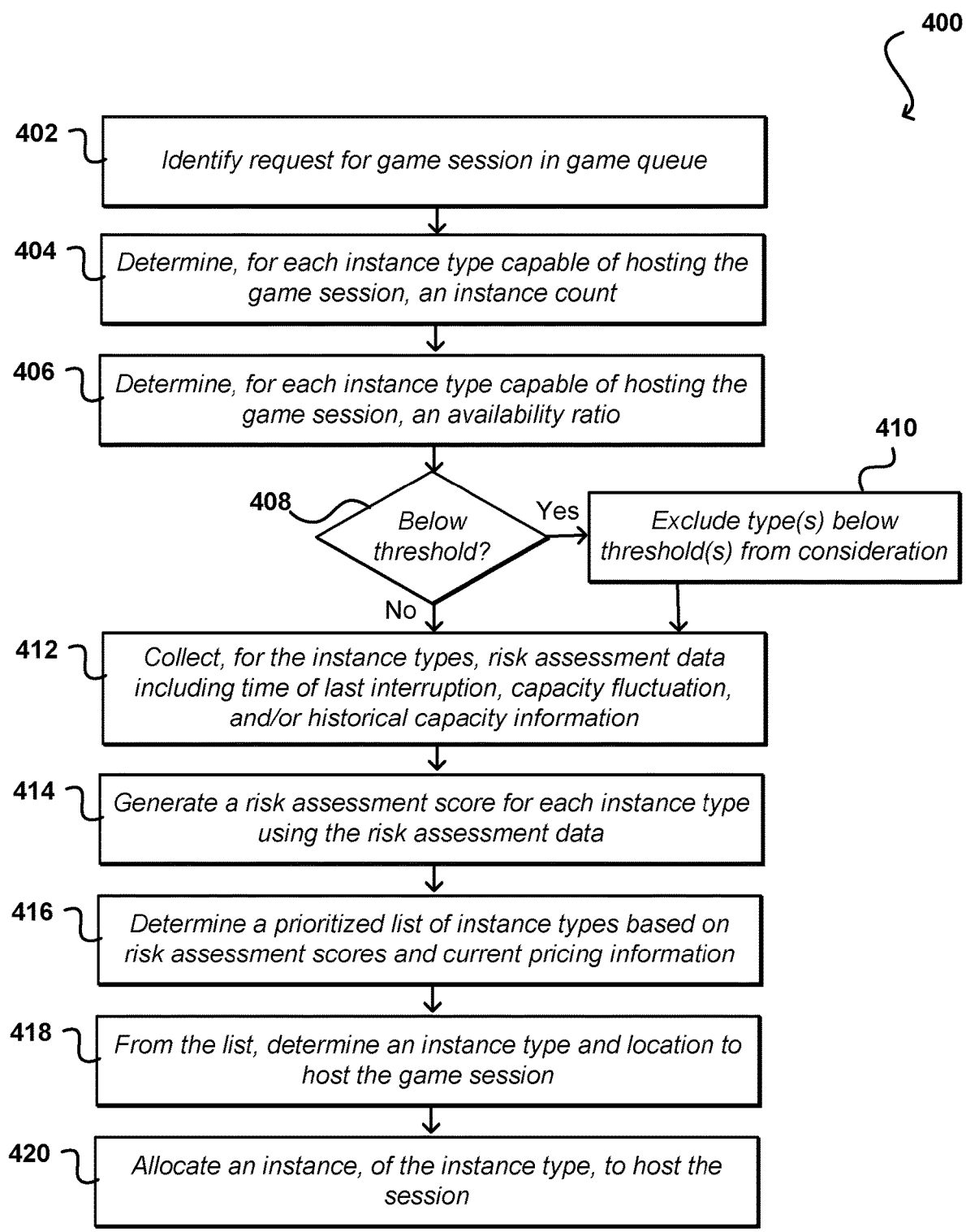
FIG. 4 illustrates an example process for determining risk for an instance type that can be utilized accordance with various embodiments.

FIG. 4 illustrates an example process 400 that can be used to select an instance type using a determined risk score that can be utilized in accordance with various embodiments. In this example, a request for a game session is identified 402 in a game queue as discussed herein. As mentioned, however, requests can be detected or determined in other was as well, and may correspond to other types of applications, within the scope of the various embodiments. As mentioned, in at least some embodiments a request for a game session can be associated with various hosting criteria that can be used to determine a type of resource, or resource instance, to host the session, in this case acting as a game server for the session.

In addition to the selection criteria, there can be various other metrics or factors used to determine an appropriate instance type for hosting the gaming session. For example, a set of resource pools can be determined that each include resources capable of providing resource capacity of one or more instance types. As a first pass or step in the selection process, a placement manager can determine 404 an instance count for each instance type, either overall or within a given resource pool. The placement manager can also determine 406, for each of those instance types, an availability ratio, again overall or within a given resource pool. A determination can then be made 408 as to whether either the instance count or the availability ratio is below a minimum threshold or cutoff value. For example, a threshold might be set such that a resource type is not selected if there are less than a specified number of instances of that type available in a given resource pool, such as less than 100 instances. The threshold can be set to any appropriate number, where an instance of that type will not be selected if there are fewer than that number as there is a likelihood of at least some of those instances being reclaimed over an upcoming period of time in which the instance might be allocated for the current request. Similarly, a threshold might be set such that a resource type is not selected if the ratio or fraction of available to allocated (or otherwise unavailable) instances is below a specified value, such as where less than 5% or 10% of the instances of a specified type are available for a given pool, or where the ratio of available to unavailable is less than 1:20, among other such options. Thus, even if there are more than 100 instances available, the type might be excluded if this represents less than 5% of the total instances of that type for that specific resource pool. If an instance type fails to satisfy at least one of these thresholds, that instance type can be excluded 410 from consideration for placement of the game session.

For the instance types that satisfy the thresholds, risk assessment data can be collected 412. This can include any appropriate data, as discussed and suggested herein, that may be useful in assessing the risk of a specific instance type. This data may include, for example, time of last interruption, number of interruptions over a recent period of time, frequency of interruption, current instance price, recent fluctuations or trends in instance price, current amount of available capacity, recent fluctuations in available capacity, historical capacity information, and predicted capacity information, among other such options. A risk assessment function in some embodiments can accept this information as input and generate 414 a risk assessment score for each instance type. An instance type can be specified across resource pools, or similar instances in different pools can be considered different instance types in various embodiments. In some embodiments, a trained machine learning model (e.g., a convolutional neural network) or other statistical algorithm can be used to provide risk scores for the instance types based on the provided risk assessment data. In addition to determining the risk assessment scores, the current pricing information for the various instance types can also be determined. This can include, for example, contacting a spot market manager or resource manager for pricing information, among other such options. If the market allows for bidding, then the information may include current or expected bid prices, or a historical range of bid prices. In this example, a prioritized list of instance types is determined 416 using the risk assessment scores and current pricing information. As mentioned, this may include various determining priority according to various prioritization criteria, such as to prioritize by amount of risk, the cost, or a combination of risk and price using a weighted combination of the factors, etc. The priority information can then be processed using a placement selection algorithm or other such approach to determine 418, from the list, an instance type to host the game session. Once an instance type is selected, an instance of that instance type can be allocated 420 to host the session, such as to function as a game server for a specific session. If the instance type can be allocated from multiple pools or locations, then a decision can be made as to the pool and/or location from which to allocate the instance. The selection can be made based on factors such as lowest latency, amount of available capacity in the pool, or relative risk scores for different resource pools, among other such options. In some embodiments capacity of a given type may not be available at the time of allocation, or a factor may have changed that causes that instance type to not be desirable for allocation. Accordingly, the process in that situation may continue down the prioritization list until a suitable instance type can be determined that is able to be allocated for hosting the session. While in some embodiments the optimal instance type might be determined for each request, in other embodiments the type might be determined periodically based on factors such as data availability and resource constraints, such that there may no longer be sufficient capacity of the determined type when an allocation is needed, at which time the system can look to the next best instance type option, etc.

In some embodiments, a lookback assessment can be performed for the instance types as well. This can include, for example, not only determining whether an instance type currently satisfies a particular threshold, but also the extent to which the threshold was satisfied over a recent period of time. For example, a threshold of 100 available instances might be specified as a minimum for consideration, and that instance type might currently be at 100. It might be the case, however, that for most of the last hour the number of available instances was below that threshold number. In such a situation, the instance type might be excluded from consideration until the threshold is satisfied at least a majority or specified minimum amount of time, or a risk score assigned to that instance type might be increased based on the amount of time over the recent period where the threshold was not satisfied. Such an approach can be advantageous as in considers recent activity instead of a single point in time, which may not be truly representative of the risk. In some embodiments the lookback assessment might attempt to determine if a given instance type was risky at any point during a recent window of time, and if so might exclude the instance type from consideration. A look forward assessment might also be performed, where the trend(s) for that instance type over the recent period of time might be analyzed to determine the likely risk over a future period of time. For example, if there are over 100 instances available at the current time then the instance type might satisfy the threshold, but if a minute ago there were 200 instances of that type available and those instances are rapidly being reclaimed (or otherwise made unavailable) then the system might determine a strong likelihood that the instance type will not satisfy the threshold over an upcoming period of time and can calculate the risk score accordingly. As mentioned, predictive algorithms can also utilize historical data to determine when capacity of a certain instance type is risky, such as at the same time every week, and can generate a risk assessment or exclusion decision based at least in part upon that observed behavior or pattern. Trends in instance pricing and other metrics can be utilized in a predictive manner as well within the scope of the various embodiments.

In some embodiments the risk assessment algorithm might also take as input information about jobs placed in the placement queue. If there are a large number of jobs to be placed, a lower tolerance for risk might be recommended. Similarly, if there is a trend in the number of jobs requiring a certain type of instance, such as where the trend is rapidly increasing, then the tolerance for risk might be lower, or the threshold used for that instance type might be raised, such as where it is anticipated a greater number of instances of that type will need to be allocated in the near future.

For some game types, there might be rounds, levels, or sessions through which a set of players will progress. In some embodiments, these can correspond to break points where the placement of the game can be reassessed. For example, a new placement request can be placed into the queue. If the placement decision comes back with the same instance type from the same pool, then the game can remain hosted on that instance. If a different decision is provided, and there is a significant advantage or difference in risk for the new placement, then the game can be migrated to a new instance. Each such change can provide an opportunity to switch to an instance type that is less risky, less costly, has lower latency, or is otherwise advantageous. As mentioned, such advantages are not limited to games but various types of applications or functionality execution, particularly where it may be undesirable for the execution to be interrupted unexpectedly.

If a new instance is selected to host a game, the newly allocated capacity may need to obtain game state data or otherwise be synchronized with a current or prior instance for the game. The synchronization can occur in a number of different ways. For example, the entire game state can be serialized to a state file that can be transferred or stored in a location accessible to multiple resources. When a newly allocated instance initiates the process to be executed for the session, the instance can obtain the serialized file and indicate to the current server, or a game server, that the newly allocated instance is available to host the process for the session. In some embodiments a snapshot of the file or game state can be provided to the new instance, which can then receive any subsequent data for updating the game state. In some embodiments the game management server will transfer the game file to the new instance and instruct the new instance to load that state, at which time the player devices can be instructed to connect to the new instance. Once the last player device reconnects the new instance can restart the game, although in some embodiments there can be a period of synchronization where both the new and old instances receive state data so the game can continue relatively seamlessly, although with a potential period of slightly enhanced latency, until all player devices are connected to the new instance.

In another embodiment, object serialization of the network can be used for the migration. When a new instance is allocated, the instance can be provided with connection information for the current game session. The new instance can connect to the existing instance and begin a catch up process to obtaining the current state data, similar to how a player device joining the session might obtain the current state data in synchronizing the state of the world. Once the new instance is synchronized it can notify the current instance (or a game manager, etc.) that it is ready to take over, and the migration can occur. In some embodiments the new instance can take over authority immediately, while in others the player devices can be requested to move or reconnect to the new instance. Once all player devices have connected to the new instance, the old instance can be terminated, reallocated, or otherwise released from responsibility for the current game session.

In another approach, all actions taken in a game session can be written to a transaction log. When a new instance is allocated, the instance can read the transaction log and update to the current state by processing the transactions in sequence. Once the new instance is up to date, the instance can elect itself as the master and the player devices can connect to the new instance. The information can continue to be written to, and pulled from, the transaction log by both instances until all player devices are connected to the new instance. In yet another embodiment, IP address or other address remapping can occur such that the player devices do not have to perform a reconnection action. If the new instance is synchronized as discussed herein, the IP address of the old instance can be remapped to the new instance, such that existing packets in flight will be rerouted to the new instance automatically. In such an approach, the players may not be able to determine that a migration has occurred. In other embodiments, a full instance migration can occur as well as discussed elsewhere herein.

Figure 5:
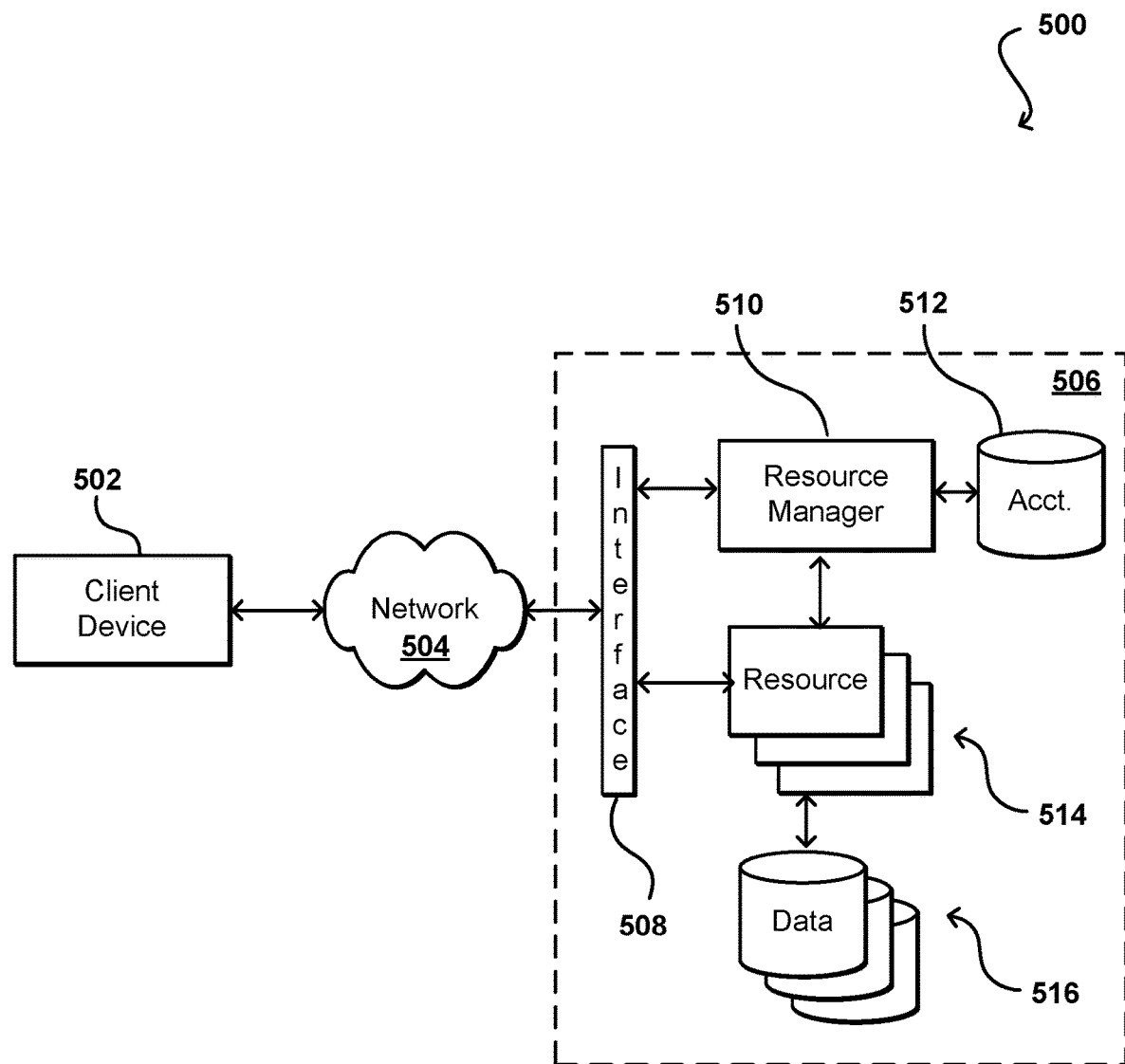
FIG. 5 illustrates an example resource environment in which various embodiments can be implemented.

FIG. 5 illustrates an example environment 500 in which aspects of the various embodiments can be implemented. In this example a user is able to utilize a client device 502 to submit requests across at least one network 504 to a multi-tenant resource provider environment 506. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The resource provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 514 of one or more types. These types can include, for example, application servers operable to process instructions provided by a user or database servers operable to process data stored in one or more data stores 516 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 514 can submit a request that is received to an interface layer 508 of the provider environment 506. The interface layer can include application programming interfaces (APIs) or other exposed interfaces enabling a user to submit requests to the provider environment. The interface layer 508 in this example can also include other components as well, such as at least one Web server, routing components, load balancers, and the like. When a request to provision a resource is received to the interface layer 508, information for the request can be directed to a resource manager 510 or other such system, service, or component configured to manage user accounts and information, resource provisioning and usage, and other such aspects. A resource manager 510 receiving the request can perform tasks such as to authenticate an identity of the user submitting the request, as well as to determine whether that user has an existing account with the resource provider, where the account data may be stored in at least one data store 512 in the provider environment. There can be a single resource manager for all relevant resources, for each region of resources, or each pool of resources, among other such options. For multiple resource managers, these managers can work as peers or under another manager system or service, etc. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 502 to communicate with an allocated resource without having to communicate with the resource manager 510, at least until such time as a relevant aspect of the user account changes, the user is no longer granted access to the resource, or another such aspect changes.

The resource manager 510 (or another such system or service) in this example can also function as a virtual layer of hardware and software components that handles control functions in addition to management actions, as may include provisioning, scaling, replication, etc. The resource manager can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 6:
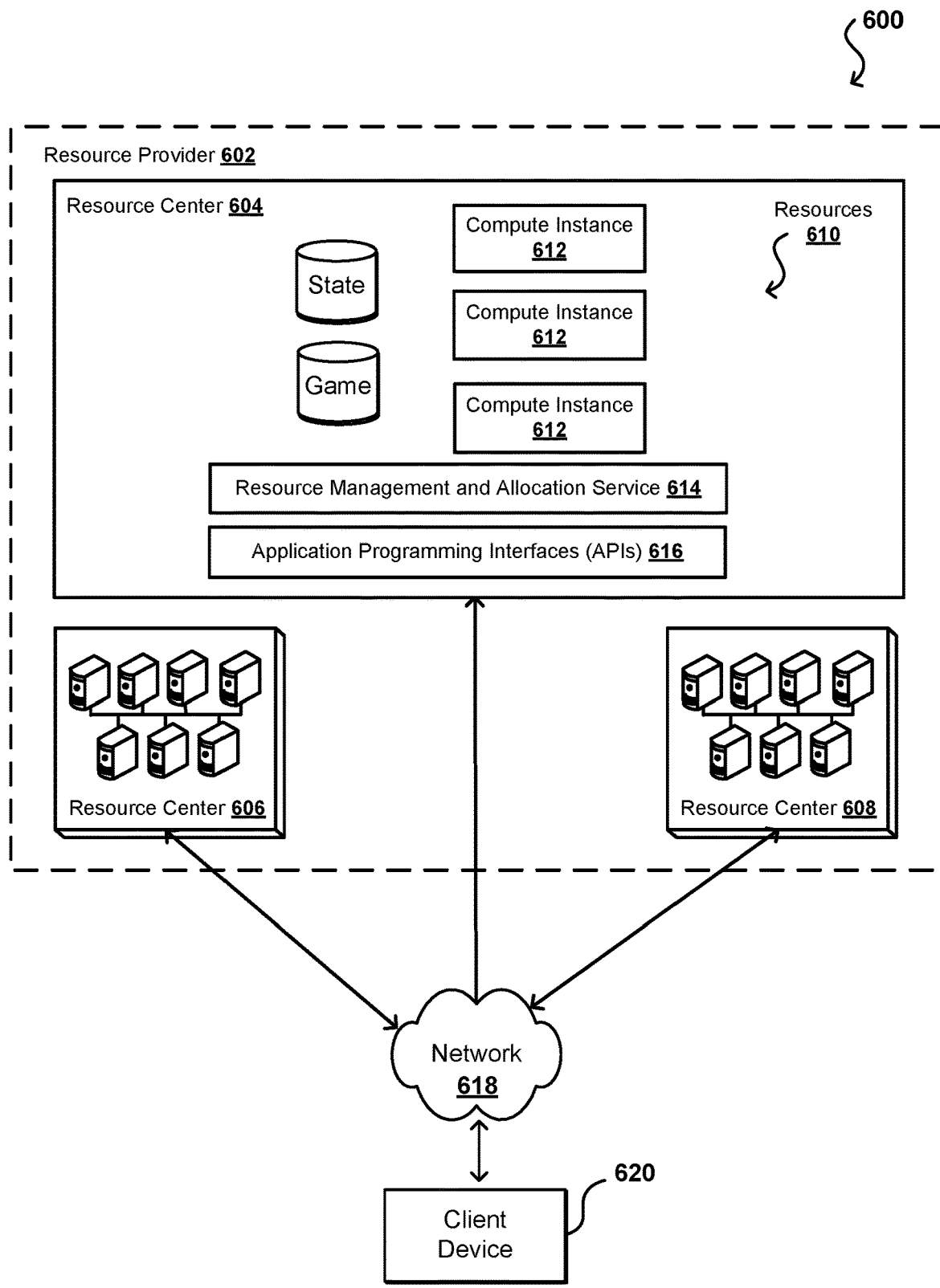
FIG. 6 illustrates another example resource environment in which various embodiments can be implemented.

FIG. 6 illustrates another example resource provider service 600 that can be utilized in accordance with various embodiments. As illustrated, a resource provider environment 602 can include a variety of devices and components (e.g., servers and network infrastructure) for receiving and processing requests from various customers and end users across one or more networks 618. As discussed, access to these resources can be provided as one or more services, such as Web services. In this example, the resource provider environment includes a plurality of resources 610, such as data storage resources and request processing resources, that can be deployed in one or more resource centers 604, 606, 608 that may be in different logical or physical locations, such as in different geographical regions, made accessible over the one or more networks 618. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, gaming host, content delivery network (CDN) point-of-presence (POP), and the like.

In accordance with various embodiments, resource centers of the resource provider 602 may include various computer servers, data storage machines, network devices and other hardware resources necessary to provide the network-accessible services on behalf of the clients of the service provider. For example, as illustrated the resource centers can include physical servers and other devices located in a particular geographical location, which enable the service provider to host game sessions and perform other functions on behalf of various client devices 620. In accordance with an embodiment, a resource center can include media cache servers, gaming servers, data servers, and the like. The view of one of the resource centers 64 is shown in an exploded view to provide further illustration of the types of resources 610 that can be contained in a resource center in accordance with various embodiments. It should be noted that the resources 610 can reside in one resource center or can alternatively be distributed across multiple resource centers.

In accordance with various embodiments, the resource provider 602 offers a resource management and allocation service 614 in addition to many other services discussed herein. In one embodiment, the resource management and allocation service 614 can perform the selection and management of resources used to host sessions for one or more gaming applications associated with a customer of the resource provider. In addition to the computing resources, the hosting of the games may require the allocation of data resources to host game state or game content, among other such options. In accordance with an embodiment, components of the resource provider environment 602 enable a game publisher to provide (e.g. upload) a gaming application to a game content store, where that application can be launched using various compute instances 612 that can each correspond to all, or a subset, of a resource such as a physical server. In accordance with various embodiments, the resource management and allocation service 614 can allocate the compute instances 612 for hosting the various gaming sessions. Information for the sessions can be provided using one or more APIs 616, for example, which can be used to provide the criteria or configuration information to be used for selecting and hosting a game session. In one embodiment, each compute instance is a virtual server resource or virtual node having a specific processing capacity and memory associated therewith, which allows the service provider to meter the usage of the resources for each customer. That is to say that each gaming session can be associated with a customer, and the usage of those resources allocated to the customer can be aggregated for at least cost purposes. In an alternative embodiment, the compute instances can be actual server machines in the resource center 604 maintained by the service provider and leased to its customers as discussed herein.

It should be noted that the locations of the various resources are not limited to any particular resource center, server or physical computing device. It will be evident to one of ordinary skill in the art that various stores, storage containers, servers, compute instances, gaming services, and other resources described herein can be located in any resource center or distributed across multiple resource centers or geographical locations, allowing data or content to be replicated across all or some of the devices therein. For example, one resource center 606 could be in Europe, one resource center 608 could be Asia, and one resource center 610 could be in the United States. In various embodiments, the various storage containers, servers, compute instances, transcoding services and other resources described herein could also reside on a single device.

In accordance with various embodiments, the resource management and allocation service 614 can provide game publishers with an automated game session workflow system that is reliable and scalable. The game publishers may define the session parameters on their own or leverage a set of predefined common device profiles that are provided by the service provider. The service can allow the game publishers to upload game content to the storage instance, define a workflow, host the relevant game session, and deliver the results to the appropriate players or other destinations. In some embodiments, the game session results can be made available or delivered to third parties for distribution, such as through an online video sharing service. Generally, a game publisher (e.g. customer of the resource provider) can register for an account by signing up, for example, with the resource provider to gain access to resource management and allocation service 614. Once an account is created, game content can be placed into a game store on the resource provider. A workflow can be defined using an application programming interface (API) 616 or console, for example, to manage game sessions which will be carried out using one or more of the compute instances 612. In accordance with various embodiments, the resource provider 602 may implement a number of pricing models for using the resources as discussed herein. As one option, the pricing could be based at least in part on the usage of compute instances 612 are utilized by the game publisher, including the type and duration of such utilization. For example, on-demand instances can let customers of the provider pay for compute capacity by the hour or for maximum-duration periods of time, as discussed elsewhere herein. As an alternative option, the game publishers can use reserved compute instances. When using reserved instances, game publishers can make a one-time, up-front payment for each instance they wish to reserve for a long period of time (e.g. 1-3 year term). In return, the customer may be given a discount off the ongoing hourly usage rate for the instances.

As an alternative option, a set of spot instances could be utilized. In accordance with an embodiment, spot instances enable a game publisher to bid on, and purchase, unused capacity of the compute instances of other customers at a market place. In some embodiments, instances sold on the spot market may be reclaimed at any moment (with some notice period) if they are needed for customers that have previously reserved the computing capacity. In some cases, the spot instances may be used for game sessions where the potential for interruption is not extremely important. In other cases, using spot instances may be an effective way to get sessions hosted cheaply if there are a significant number of spot instances available. Taking advantage of low bid opportunities for instances can provide a customer (e.g. a game publisher) with pricing advantages they may not have been offered without building out services on their own.

In accordance with various embodiments, each computing resource instance can be reserved for use by a particular customer or other user for a defined period of time. During the time periods where that customer is not using the resource, at least some excess or otherwise unused resource capacity of that computing resource may be made available to other users on a temporary or non-guaranteed basis, such that the excess resource capacity can be allocated to other users until a time that the capacity is desired for other purposes (e.g., for preferential or reserved use). Such excess capacity may, for example, be made available as part of one or more general excess capacity pools that are available for use by various users, such as via a spot market with dynamically changing pricing to reflect supply and demand. In some cases, one or more programs may be executing on behalf of a user using excess resource capacity at the time that the excess resource capacity is desired for other purposes, and, in some such cases, the use of that excess capacity (e.g., storage for that user in the excess capacity) may be automatically terminated (e.g., deleted) by the computing resource in order to make that excess capacity available for the other purposes. In at least some embodiments, the user requests or operations can be automatically restarted at a future time, such as when a sufficient amount of excess capacity again becomes available for such purposes. Alternatively, other resource capacity may be identified and used in place of the excess resource capacity that is desired for the other purposes, so as to enable the operations relying on the excess resource capacity to continue to be processed or otherwise fulfilled.

Customers can utilize the unused or excess capacity from dedicated, reserved, or other such resource capacity. In accordance with an embodiment, customers can bid to use the excess capacity. For example, a customer can submit a game hosting request for an instance with a bid price and a specification of at least one resource guarantee to be provided for the request, such as a minimum throughput, compute capacity, etc. If a resource becomes available that meets the capacity requirement(s) for the instance request, if the bid exceeds any other requests (or otherwise has preference or priority), and if the bid at least meets a current market price for that capacity, the instance request can be processed using the excess capacity. In various embodiments, the customer with the winning bid will obtain dedicated use of that excess capacity for at least a period of time to process the transcoding operations associated with the instance created per the instance request. After that minimum time, the bid amount can be reexamined and, if the request no longer meets the winning criteria discussed above, or some other such criteria, fulfilling of the instance request for that user on that resource can be terminated (e.g., the instance can be terminated on that resource). Further, if the capacity is excess capacity reserved or dedicated to another user, the customer can be kicked off the resource at any time if the dedicated or reserved customer resumes using that resource.

Figure 7:
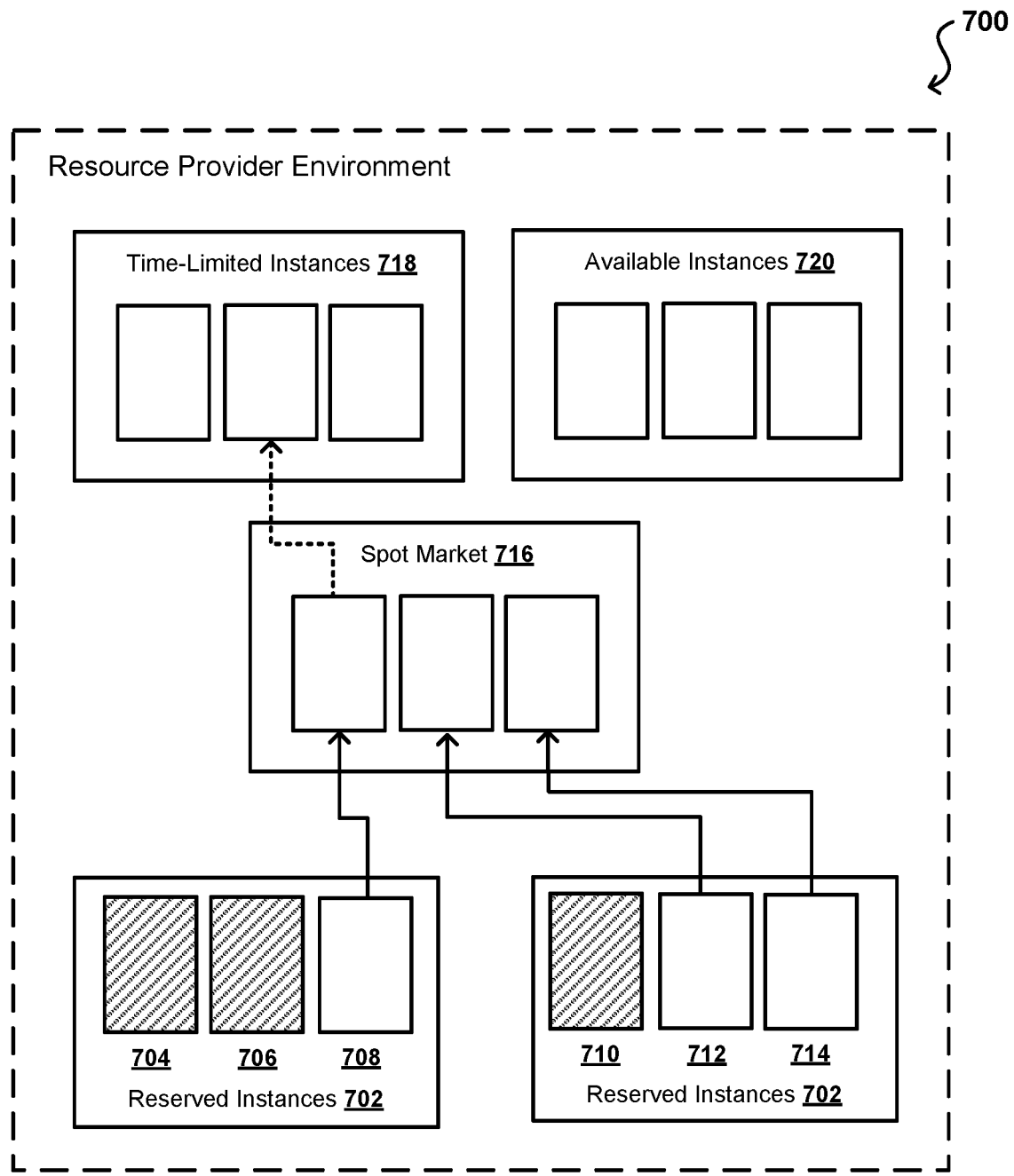
FIG. 7 illustrates an example resource environment including multiple types of instance options that can be utilized in which various embodiments can be implemented.

FIG. 7 illustrates an example resource provider environment that includes various types of capacity that can be allocated for hosting game sessions and other such tasks in accordance with various embodiments. In the illustrated embodiment, the resource provider 700 provides a market whereby a customer can purchase capacity for different types of instances. This can include a spot market 716 that enables various game publishers, or other content publishers or customers, to bid for unused resource capacity of the resource provider 700. The spot market can take the form of a graphical user interface (GUI), console, application programming interface (API), a web application or any other component. In this example, the customer can also purchase time-limited instances 718, which function as guaranteed or reserved instances are only available for up to a maximum length of time. In some embodiments the time-reserved instances can also come from the spot market if the notice period or other criterion for the capacity enables those resources to be provided for the specified period of time without interruption, such as where the notice period is five minutes but the time limited resource is needed for two minutes. The customer can also purchase available instances 720 using a conventional approach, such as to reserve instances for an extended period of time as discussed herein.

In accordance with one embodiment, the resource provider 700 allows customers to reserve resource instances for a specified period of time for a specific price. The resource instance can be any resource that provides some unit of computing capacity, such as a virtual machine, server instance, or the like. For example, as shown in the illustrated embodiment, a first customer has reserved resource instances 704, 706, 708 and a second customer has reserved resource instances 710, 712, 714 for at least a specified time interval. During the time interval that the instances are reserved, the instances can be utilized by the reserving user at any time.

In many instances, however, a reserving user may not always be using all of the resource instances reserved on their behalf. There may often be time periods in the reservation interval, during which some of the reserved instances are remaining idle and not performing any computation. In accordance with an embodiment, the spot market 716 enables the service provider to utilize those idle instances 708, 712, 714 to host gaming sessions or perform various types of jobs for other users, while still guaranteeing that the reserved instances will be ready to immediately begin processing jobs of the reserving user if the need for them should arise. In accordance with an embodiment, the spot market 716 may accept bids for resource capacity from various users, such as one or more game publishers. Once a bid is received, the spot market can evaluate the bid and determine whether it meets or exceeds the current spot market price. In accordance with an embodiment, the current spot market price fluctuates periodically according to supply and demand for resource instances in the spot market. If, at the time of receiving the user's bid, the bid at least meets the current spot market price, the service provider can begin hosting the game session using the spot market instances. The session can continue being executed for as long as the content publisher's bid at least meets the current spot price. In accordance with an embodiment, if the spot market price rises above the bid, the session may be interrupted or suspended. Notice can be given, as with a customer reclaiming the instance, before termination. In accordance with various embodiments, if the reserving users invoke any of the reserved instances that are currently in the spot market 716, those reserved instances may be immediately taken out of the spot market pool and provided to the respective customer that reserved the instance. For example, if a reserving user invokes a resource instance 708, any game session being hosted by that resource instance 708 may be provided with notice before the capacity is reclaimed and allocated to the reserving user. The game session that was previously being hosted by the resource instance 708 may be to another available spot market instance if the bid still at least meets the current spot market price at that time.

Figure 8:
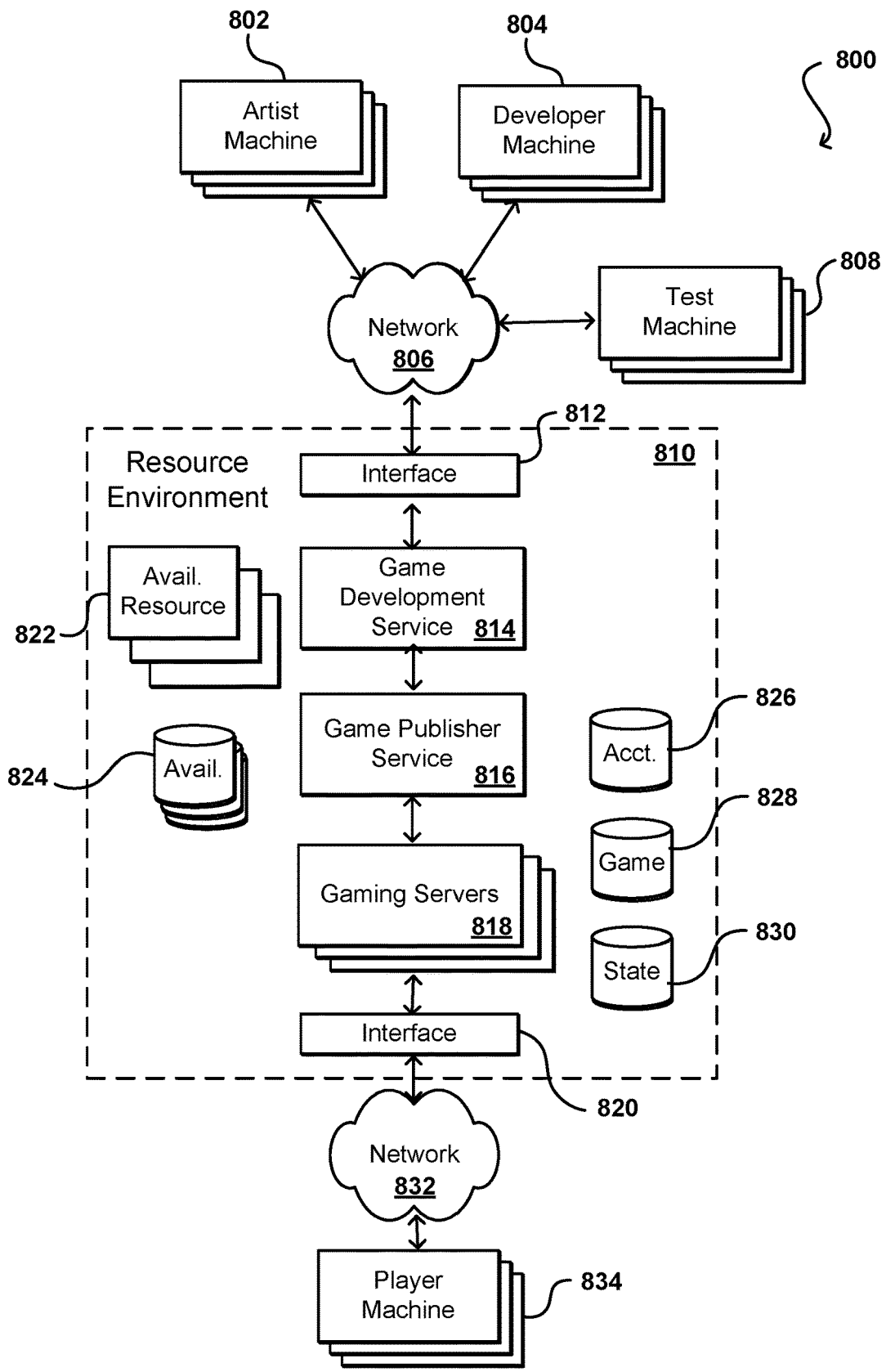
FIG. 8 illustrates an example gaming pipeline that can be used in accordance with various embodiments.

As illustrated in the example system 800 of FIG. 8, at least some of the resources can be used to support platforms and services useful in the development and providing of electronic gaming and three-dimensional graphical content, among other such options. For example, the artist machines 802 and developer machines 804 can collaborate via a game development service 814, which can be provided by a set of resources in the resource environment 810 that are able to scale dynamically as discussed above. It should be understood that artists fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 828, where the repositories can include graphics files, code, audio files, and the like. The game development service 814 can also work with an account manager, or at least maintain information in an account data store 826, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like. The game development service 814 can also be used to specify criteria, such as maximum acceptable latency, that can be used to select resource capacity to host sessions for the gaming application.

Once the game development reaches an appropriate stage in the development cycle or pipeline, as may relate to alpha or beta testing, actual release or updating, etc., the appropriate content can be made accessible to a game publisher service 816. The game publisher service 816 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 804 or otherwise. In some embodiments the game content might be published and made available to one or more test machines 808, which may be associated with the customer, such that the customer can test various builds or versions of the game. In some embodiments feedback provided by the test machines 808 may be provided to the game development service 814, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 818 which can run the game and enable player machines 834 to access the game content over one or more networks 832, which may be different from the network(s) 806 used for game development. This can include, for example, dedicated gaming networks, the Internet, cellular networks, and the like. The player machines 834 can communicate with the appropriate interfaces of an interface layer 820 to obtain the gaming content. In some embodiments the player machines 832 will download the gaming content for execution on the individual machines, and will upload (or otherwise communicate) gaming data, messages, and other information to the gaming servers 818, as well as to other players, social networking sites, or other such recipients. The gaming servers 818 can cause state information for the various instances of the game to be stored to at least one game state repository. This can hold state for the game as a whole or for individual game sessions, among other such options. In some embodiments the game content can be executed by the game servers and streamed in near real time to the player machines 834. In some embodiments there may alternatively be a mix of gaming content executed on the player machines and the gaming servers. Peer to peer connections among the player machines and other communications can be utilized as well in various embodiments.

Such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function, whether specifically related to hosting a game session or otherwise. A resource instance can be allocated to run a function in response to a customer request or event, and once the function has completed that instance can either be made available for processing a different event or destroyed, among other such options. In either case, the customer will not be charged for more processing by the instance than was needed to run the function.

As mentioned, the ability to utilize different types of capacity can come with a significant cost savings in at least some embodiments. For example, excess capacity or spot instances can be obtained at significant cost reduction, such as with discounts between 40% and 80% with respect to an on-demand fleet in some embodiments, depending upon the current bid rate for the capacity, among other such factors. Similarly, discounts can also be obtained for the limited time capacity, but these discounts may be less than for the excess capacity and may be at a fixed rate, such as at a 45% discount. In some embodiments the rate may depend in part upon the length of time for which the resource is requested. The additional resource options provide benefit to the customer in relation to cost and potentially performance and other aspects, while such options can provide the resource provider with flexibility in the types of instances used and the ability to place a hosted game server into a region that may be closer to the player than might otherwise be possible, potentially improving latency and other such characteristics. The flexibility can also help the resource provider to rebalance capacity as appropriate. As mentioned, potential tradeoffs for the customer are the potential for excess capacity instances to be interrupted, or for games to time out if hosted on limited time instances. Further, since excess capacity for a particular type of resource may be insufficient at the time of a request, a customer can specify multiple acceptable instance types with appropriate configurations that can be used to host the game session. A customer might then provide selection criteria or preferences, such as to select the available type with the lowest cost, highest performance, or lowest risk of interruption, among other such options. A customer in some embodiments might also provide priority selections with respect to the geographic locations of the resources. The flexibility of instance type can also reduce the amount of time needed to initiate a game session, particularly where some instance types can be queued up for such hosting when capacity is available. In some embodiments a resource console can be used to manage the various instance options.

Figure 9:
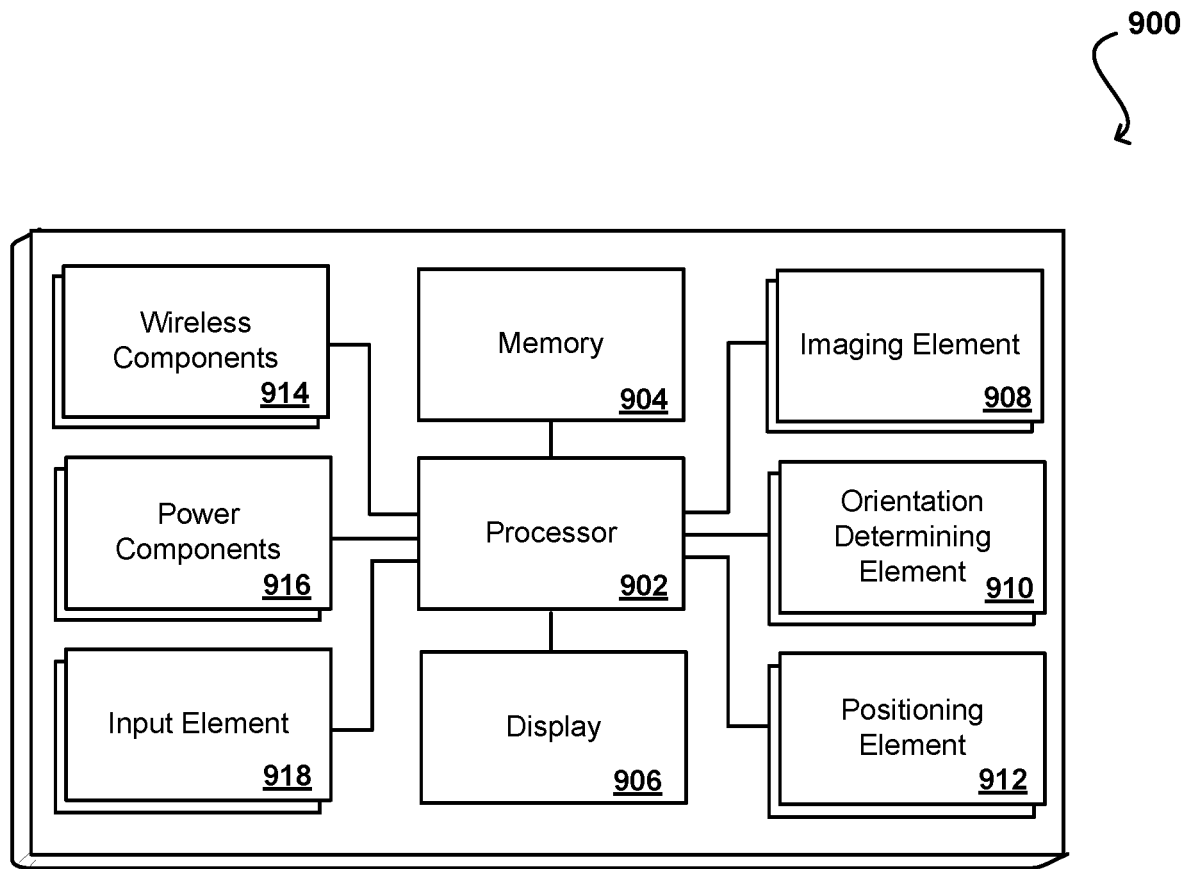
FIG. 9 illustrates example components of a computing device that can be used to implement aspects of the various embodiments.

FIG. 9 illustrates a set of basic components of an electronic computing device 900 that can be utilized to implement aspects of the various embodiments. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices. The device typically will include some type of display screen 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element (s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device.

Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   detecting a session hosting request in a session queue, the session associated with a gaming application;
   determining, from the request, hosting criteria for the session;
   determining a plurality of instance types for resource instances satisfying the hosting criteria and able to host the session, the instance types corresponding to reclaimable capacity capable of being reclaimed by one or more entities associated with the capacity;
   calculating, for respective instance types of the plurality of instance types, a risk score based at least in part on a frequency of interruptions of the reclaimable capacity over a preceding time period, the risk score indicating a likelihood that a resource instance of the instance type will be reclaimed during the session;
   calculating, for respective instance types of the plurality of instance types, a ratio of available instances to total instances;
   determining respective costs per resource instance for the respective instance types;
   selecting, from the plurality of instance types, a selected instance type, the selected instance type being selected using the risk score, the ratio, and the respective cost per resource instance; and
   allocating a selected resource instance, of the selected instance type, to host the session for the gaming application.

2. The computer-implemented method of claim 1, further comprising:
   calculating the risk score using a risk assessment function, the risk assessment function accepting as input at least one of a time since last reclamation, a history of reclamation, a number of available instances, a number of pending requests, recent pricing trends, recent instance allocation trends, or customer reclamation data.

3. The computer-implemented method of claim 1, further comprising:
   determining a plurality of locations from which the selected resource instance is able to be selected; and
   selecting the selected resource instance to allocate from a selected location, of the plurality of locations, based at least in part upon expected latency values for respective locations of one or more player devices to participate in the session.

4. The computer-implemented method of claim 1, further comprising:
   selecting the selected instance type based on a lowest cost, a lowest risk score, or a weighted combination of the cost and the risk score for each instance type.

5. The computer-implemented method of claim 1, further comprising:
   causing the selected resource instance to function as a game server for the session; and
   enabling player devices, participating in the session, to communicate with the selected resource instance.

6. A computer-implemented method, comprising:
   receiving a request to obtain resource capacity to execute at least one task, the request associated with one or more hosting criteria;
   determining a plurality of instance types that satisfy the hosting criteria, the instance types corresponding to reclaimable resource capacity available through an electronic resource environment;
   determining respective risk scores for the instance types based at least in part on a frequency of interruptions of the reclaimable resource capacity over a preceding time period, the respective risk scores each indicating a likelihood of the respective resource capacity being reclaimed before completion of execution of the at least one task;
   determining a ratio of available instances to total instances for the instance types;
   determining, from the plurality of instance types and using the respective risk scores and the ratio, a selected instance type;
   determining, from a plurality of resource pools, a selected resource pool from which to provide a selected resource instance of the selected resource type; and
   allocating, for execution of the at least one task, the selected resource instance of the selected instance type from the selected resource pool.

7. The computer-implemented method of claim 6, further comprising:
   causing a subsequent task to be performed using dedicated resource capacity in response to determining that no instance types of the reclaimable resource capacity satisfy at least one of a maximum cost or a maximum risk score for the subsequent task.

8. The computer-implemented method of claim 6, further comprising:
   determining a number of available instances of each instance type; and
   excluding from consideration any of the instance types that do not have at least a minimum number of available instances.

9. The computer-implemented method of claim 6, further comprising:
   excluding from consideration any of the instance types that fail to satisfy a minimum ratio threshold for the ratio.

10. The computer-implemented method of claim 6, further comprising:
    excluding from consideration any of the instance types that have failed to satisfy a minimum number of instances or a minimum ratio threshold for the ratio over a preceding period of time.

11. The computer-implemented method of claim 6, further comprising:
    detecting a hosting request in a session queue, the hosting request specifying the at least one task, wherein a subsequent hosting request detected in the session queue is able to obtain a subsequent resource instance allocation of a determined instance type using one or more hosting criteria for the subsequent hosting request.

12. The computer-implemented method of claim 6, further comprising:
    determining that the selected resource instance is to be reclaimed; and
    providing notice to an entity associated with the at least one task that the selected resource instance is to be reclaimed at a specified time.

13. The computer-implemented method of claim 6, further comprising:
calculating the respective risk scores using a risk assessment function, the risk assessment function accepting as input at least one of a time since last reclamation, a history of reclamation, a number of available instances, a number of pending requests, pricing trends, instance allocation trends, or customer reclamation data.

14. The computer-implemented method of claim 6, further comprising:
determining a plurality of locations from which the selected resource instance is able to be selected; and
selecting the selected resource instance to allocate from a selected location, of the plurality of locations, based at least in part upon expected latency values for respective locations of one or more player devices to participate in the session.

15. The computer-implemented method of claim 6, further comprising:
selecting the selected instance type based on a lowest cost, a lowest risk score, or a weighted combination of the cost and the risk score for each instance type.

16. The computer-implemented method of claim 6, further comprising:
causing the selected resource instance to function as a game server for a gaming session in which the at least one task is to be executed; and
enabling player devices, participating in the gaming session, to communicate with the selected resource instance.

17. A system, comprising:
at least one processor; and
memory including instructions that, when executed by the at least one processor, cause the system to:
receive a request to obtain resource capacity to execute at least one task, the request associated with one or more hosting criteria;
determine a plurality of instance types that satisfy the hosting criteria, the instance types corresponding to reclaimable resource capacity available through an electronic resource environment;
determine respective risk scores for the instance types based at least in part on a frequency of interruptions of the reclaimable resource capacity over a preceding time period, the respective risk scores each indicating a likelihood of the respective resource capacity being reclaimed before completion of execution of the at least one task;
determine a ratio of available instances to total instances for the instance types;
determine, from the plurality of instance types and using the respective risk scores and the ratio, a selected instance type;
determine, from a plurality of resource pools, a selected resource pool from which to provide a selected resource instance of the selected resource type; and
allocate, for execution of the at least one task, the selected resource instance of the selected instance type from the selected resource pool.

18. The system of claim 17, wherein the instructions when executed further cause the system to:
calculate the respective risk scores using a risk assessment function, the risk assessment function accepting as input at least one of a time since last reclamation, a history of reclamation, a number of available instances, a number of pending requests, pricing trends, instance allocation trends, or customer reclamation data.

19. The system of claim 17, wherein the instructions when executed further cause the system to:
determine a plurality of locations from which the selected resource instance is able to be selected; and
select the selected resource instance to allocate from a selected location, of the plurality of locations, based at least in part upon expected latency values for respective locations of one or more player devices to participate in the session.

20. The system of claim 17, wherein the instructions when executed further cause the system to:
select the selected instance type based on a lowest cost, a lowest risk score, or
a weighted combination of the cost and the risk score for each instance type.

\* \* \* \* \*

UNITED STATES PATENT AND TRADEMARK OFFICE
CERTIFICATE OF CORRECTION

PATENT NO. : 10,994,198 B1
APPLICATION NO. : 16/203184
DATED : May 4, 2021
INVENTOR(S) : Christopher Byskal, Natalia Rose Carvalho and Justin Miles Page 1 of 1

It is certified that error appears in the above-identified patent and that said Letters Patent is hereby corrected as shown below:

On the Title Page

Item (72) identifying the Inventors, delete the paragraph and insert the following:
Christopher Byskal, Redmond, WA (US); Natalia Rose Carvalho, Seattle, WA (US); Justin Miles, Redmond, WA (US)

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*